United States Patent [19]

Buchwalder et al.

[11] 4,122,048

[45] Oct. 24, 1978

[54] PROCESS FOR CONDITIONING CONTAMINATED ION-EXCHANGE RESINS

[75] Inventors: Michel Buchwalder, Seloncourt; Roger Perrin, Charost; Daniel Thièry, Saint Martin D'Heres, all of France

[73] Assignee: Commissariat a l'Energie Atomique, Paris, France

[21] Appl. No.: 822,319

[22] Filed: Aug. 5, 1977

[30] Foreign Application Priority Data

Aug. 12, 1976 [FR] France ................................ 76 24624

[51] Int. Cl.[2] ............................ C08F 8/32; C08F 8/42; C08J 3/00

[52] U.S. Cl. ......................................... 521/26; 521/32; 521/33; 521/28

[58] Field of Search .............. 260/2.2 R, 2.1 M, 2.1 E

[56] References Cited

U.S. PATENT DOCUMENTS 3,627,705 12/1971 Kingsbury ........................ 260/2.2 R

*Primary Examiner*—Stamford M. Levin

*Attorney, Agent, or Firm*—Lane, Aitken, Dunner & Ziems

[57] ABSTRACT

Process for conditioning contaminated ion-exchange resins, more particularly contaminated cationic resins, wherein the contaminated ion-exhange resin or resins are brought into contact with a basic compound in a sufficient quantity to block the active sites of the cationic resin or resins, the thus treated ion-exchange resin or resins are incorporated into an ambient temperature-thermosetting resin and the latter is crosslinked.

16 Claims, No Drawings

PROCESS FOR CONDITIONING CONTAMINATED ION-EXCHANGE RESINS

BACKGROUND OF THE INVENTION

The present invention relates to a process for conditioning contaminated ion-exchange resins, and more particularly to the conditioning of contaminated cationic resins. The process of the invention applies in general manner to the conditioning of mixtures of cationic and anionic resins.

The ion-exchange resins which it is desired to condition by the present process are polystyrene resins cross-linked with divinylbenzene having either sulphonic $SO_3H$ groups (cationic resins) or OH functions fixed to a quaternary ammonium group (anionic resins).

French Patent Application EN 73 4005 filed on Nov. 9, 1973 by the present Applicant describes a process for conditioning ion-exchange resins which have been used for the purification of contaminated water. It is known that ion-exchange resins used for purifying contaminated water, particularly water from moderators, are subject to degradation phenomena after a certain time and consequently lose their effectiveness. It is then a question of conditioning these spent ion-exchange resins. However, during use these resins fix a certain number of radioelements which give them a certain radioactivity. According to the process described in French Application EN 73 4005, said ion-exchange resins are incorporated into a resin which is polymerisable at ambient temperature, and the polymerisation of the latter is then brought about to obtain a solid block.

However, the process of French Application EN 73 4005 has a disadvantage when the ion-exchange resins which it is desired to condition are cationic resins which are not completely spent. In this case it has been found that the polymerisation of the resin used for covering the ion-exchange resins does not take place in a complete manner.

The Applicant has performed research in this connection and has found that the reason why the polymerisation of the resin used to coat the ion-exchange resins is incomplete is due to the presence of active sites still contained in a not completely spent cationic resin. In other words, the $H^+$ protons contained in such a cationic resin consume certain of the compounds added to the polymerisable resin, more particularly the accelerator and thus retard polymerisation.

BRIEF SUMMARY OF THE INVENTION

The object of the present invention is a process permitting an effective conditioning of contaminated ion-exchange resins no matter whether they are anionic, cationic or a mixture of two and no matter to what degree they are spent.

According to the process of the invention, the contaminated ion-exchange resin or resins are brought into contact with a basic compound in a sufficient quantity to block the active sites of the cationic resin or resins, the thus treated ion-exchange resin or resins are incorporated into an ambient temperature-thermosetting resin and the latter is cross-linked.

The basic compound which serves to block the active sites of the ion-exchange resin or resins comprises either a metallic hydroxide such as soda, ammonia or lime, or a metal salt such as aluminium chloride, sodium acetate, sodium citrate or sodium oxalate, or an amine such as pyridine. This basic compound can either be used in the form of an aqueous solution with a molarity of 0.1 to 10 M or as it is.

Thus, according to the process of the invention, the first pre-treatment stage of the ion-exchange resins by means of a basic compound which blocks their active sites makes it possible to obtain during the second stage of incorporating said resins into a thermosetting resin and the cross-linking of said thermosetting resin, a good polymerisation and consequently a satisfactory confinement of the contaminated ion-exchange resins.

In the case where soda is used as the basic compound, the active sites of the cationic resin are blocked by a substitution reaction shown diagrammatically below:

$$R\,SO_3H + NaOH \rightarrow RSO_3Na + H_2O$$

In the case where pyridine is used as the basic compound, the pyridine is considered to simply neutralise the proton of the cationic resin $RSO_3H$ and there is in fact no true substitution reaction.

In the case where it is desired to condition a mixture of cationic and anionic ion-exchange resins, it is necessary to choose for the pre-treatment a basic compound whereof the nature and the concentration in which it is used are suitable for both types of ion-exchange resins. Thus, for example, to pre-treat a mixture of $\frac{2}{3}$ cationic resin and $\frac{1}{3}$ anionic resin by means of soda, it is necessary to use a soda solution whose concentration is 5 to 10%, that is to say the pH is preferably 6 to 12.

The thermosetting resin into which is incorporated the contaminated ion-exchange resin or resins following their pre-treatment by means of a basic compound can advantageously be constituted by a polyester resin such as a glycol-maleophthalate-based resin mixed with styrene. In this case the conventional compounds necessary for ensuring the copolymerisation of the styrene with the polyester and the control of the cross-linking time are used, i.e. a catalyst such as methyl-ethyl-ketone peroxide or benzoyl peroxide (in a proportion of 1 to 2% by weight of catalyst based on the resin), an accelerator such as cobalt naphthenate or dimethylaniline (in a proportion of 0.1 to 0.2% by weight based on the resin), reaction controlling agents such as retarding agents (catechol-based compound marketed under the trade name "NLC 10") and moderators ($\alpha$-methyl-styrene). Thus, the polymerisation reaction started by the active radicals of the peroxide activated by the accelerator bring about the grafting of the styrene molecules onto the glycol-maleophthalate chains, followed by an arrangement in a three-dimensional network.

According to the process of the invention, it is also possible to use as the thermosetting resin an epoxy resin mixed with an appropriate hardening agent (amine or organic acid). It is also possible to use a phenoplast resin.

Preferably one part of pre-treated ion-exchange resin is incorporated into one part of thermosetting resin.

More specifically the process of the invention is performed in the following manner:

The first embodiment of the present process consists of passing a solution of the basic compound over the contaminated ion-exchange resins located in a column. After passing the solution of the basic compound into the said column, the thus pre-treated resins can optionally be washed. They are then suction-filtered, incorporated in identical proportions in a thermosetting resin and finally said thermosetting resin is cross-linked.

This first embodiment has the advantage that during the passage of the solution of the basic compound over the contaminated resins, there is a continuous exchange during the displacement of the solution of the basic compound along the column and consequently a maximum effectiveness with regard to the blocking of the active sites of the ion-exchange resins. However, according to this embodiment the solution of the basic compound may extract certain of the radioelements, particularly cesium which were fixed to the ion-exchange resins, so that this solution which has become radioactive must be conditioned in a random manner.

A second embodiment of the present process comprises mixing the contaminated ion-exchange resins with a solution of the basic compound in a container, whereby the contact time must be about two hours. Then, following the optional washing of the thus pretreated ion-exchange resins, they are suction-filtered and incorporated in equal proportions into a thermosetting resin. Finally, said thermosetting resin is cross-linked. This second embodiment has the advantage of being very simple to perform. However, it should only be used for conditioning contaminated resins which do not have a too high radioactivity (the integrated dose remaining below $10^9$ rads).

The pre-treatment operation by means of a basic compound can also be performed by mixing said compound as it is with ion-exchange resins. This is particularly the case when using lime or sodium oxalate.

The invention is illustrated hereinafter by a number of non-limitative examples.

EXAMPLE I

A mixture of $\frac{2}{3}$ cationic resin "Duolite ARC 351"and $\frac{1}{3}$ anionic resin "Duolite ARA 366" (marketed by the Diaprosim Company) filled with 60 Co is successively treated with a basic compound constituted by soda (example no. 1), ammonia (example no. 2), pyridine (example no. 3), sodium acetate (example no. 4), sodium citrate (example no. 5), aluminium chloride (example no. 6), lime (example no. 7) and sodium oxalate (example no. 8). This mixture of ion-exchange resins is in the form of moist grains (55% humidity).

The attached table summarises the conditions of this pre-treatment according to the nature of the basic compound used.

The mixture of the thus pre-treated ion-exchange resins is then incorporated into a glycol-maleophthalate-based polyester resin mixed with styrene in the following proportions: 50 parts by weight of pre-treated resins and 50 parts by weight of polyester resin to which is also added 1.5% by weight of catalyst based on the polyester resin and 0.2% by weight of accelerator based on the polyester resin.

After between 30 and 60 minutes a solid homogeneous block is obtained having the following characteristics:

Leaching $\simeq 2.10^{-6}$ cm.d$^{-1}$ — 110 days
Compression behaviour $\simeq$ 100 hg/cm$^2$.

EXAMPLE II

Resins identical to those of Example I were treated with 0.1 M soda, then coated by means of an epoxy resin XW 272 of the bisphenol type and hardening agent XW 414 marketed by CIBA (50 parts of exchangers and 50 parts of epoxy resin). This type of epoxy resin was chosen due to its easy use and its good radiation behaviour (5-$10^9$ rads blocks unchanged).

Thus, the process according to the invention makes it possible to condition in a simple and effective manner contaminated ion-exchange resins and more particularly not completely spent cationic resins. The process according to the invention also makes it possible to condition other ion-exchanger materials such as zeolites and diatomaceous earths.

TABLE

| Examples | Basic Compound | Basic compound quantity in parts by weight for treating 100 parts by weight of ion-exchanger resins. | Concentration of the basic compound solution for neutralising the active sites. |
|---|---|---|---|
| no. 1 | Soda | 30 parts | 50 g/l |
| no. 2 | Ammonia | 75 parts | 500 g/l |
| no. 3 | Pyridine | 60 parts | 100 g/l to 500 g/l |
| no. 4 | Sodium-acetate | 70 parts | 70 g/l to 100 g/l |
| no. 5 | Sodium-citrate | 75 parts | 100 g/l to 200 g/l |
| no. 6 | Aluminium-chloride | 60 parts | 300 g/l |
| no. 7 | Lime | 15 parts | directly mixed with the ion-exchange resins |
| no. 8 | Sodium-oxalate | 50 parts | directly mixed with the ion-exchange resins |

What is claimed is:

1. A process for conditioning contaminated ion-exchange resins selected from the group consisting of cationic or a mixture of cationic and anionic resins, wherein the contaminated ion-exchange resin or resins are brought into contact with a basic compound in a sufficient quantity to block the active sites of the cationic resin or resins, the thus treated ion-exchange resin or resins are incorporated into an ambient temperature-thermosetting resin and the latter is cross-linked.

2. A process as claimed in claim 1, wherein the basic compound comprises a metallic hydroxide chosen from the group consisting of soda, ammonia and lime.

3. A process as claimed in claim 1, wherein the basic compound comprises a metal salt chosen from the group consisting of aluminium chloride, sodium acetate, sodium citrate and sodium oxalate.

4. A process as claimed in claim 1, wherein the basic compound comprises an amine.

5. A process as claimed in claim 1, wherein the basic compound is used in the form of an aqueous solution.

6. A process as claimed in claim 1, wherein the thermosetting resin comprises a polyester resin.

7. A process as claimed in claim 1, wherein one part of the thus treated ion-exchange resins is incorporated into one part of thermosetting resin.

8. A process as claimed in claim 1, wherein the treatment of the ion-exchange resin or resins by a basic compound is effected by passing a solution of said basic compound over the ion-exchange resin or resins placed in a column.

9. A process as claimed in claim 1, wherein the treatment of the ion-exchange resin or resins by a basic compound is effected by mixing in a container said ion-exchange resin or resins with said basic compound.

10. A process as claimed in claim 1, wherein said ion-exchange resin is a cationic resin.

11. A process as claimed in claim 4, wherein the amine is pyridine.

12. A process as claimed in claim 6, wherein the polyester resin is a glycol-maleophthalate-based resin mixed with styrene.

13. A process as claimed in claim 5, wherein said solution has a molarity of from 0.1 to 10 M.

14. A process as claimed in claim 1, wherein said ion-exchange resin is a polystyrene resin cross-linked with divinylbenzene having either (1) sulphonic groups or (2) hydroxy functions fixed to a quaternary ammonium group.

15. A process as claimed in claim 1, wherein the thermosetting resin is an epoxy resin.

16. A process as claimed in claim 1, wherein the thermosetting resin is a phenoplast resin.

* * * * *